Sept. 27, 1960

R. R. HARR 2,954,100

SAFETY LATCH MECHANISM

Filed Aug. 13, 1959

INVENTOR
Robert Russell Harr

BY *T. Wallace Quinn*

ATTORNEY

Sept. 27, 1960 R. R. HARR 2,954,100
SAFETY LATCH MECHANISM
Filed Aug. 13, 1959 3 Sheets-Sheet 2
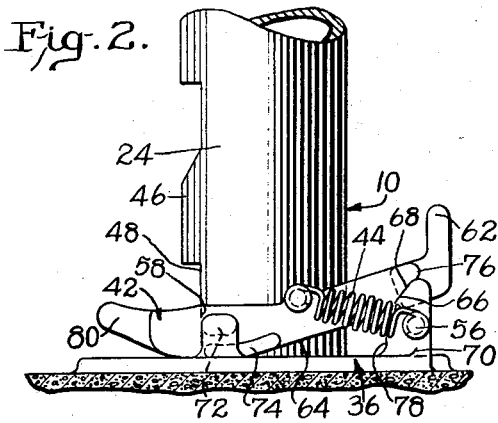
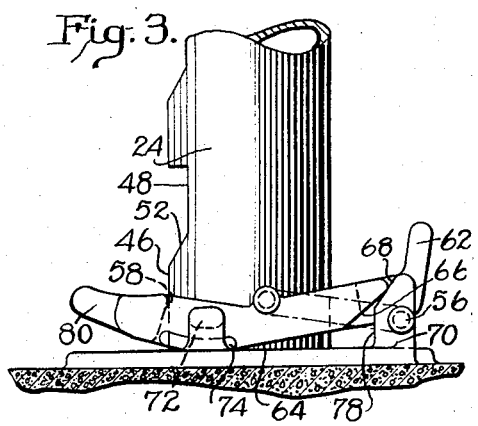
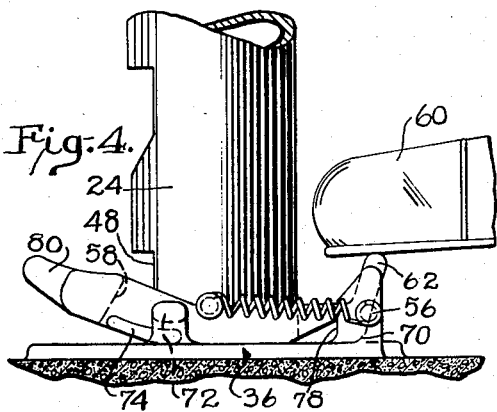
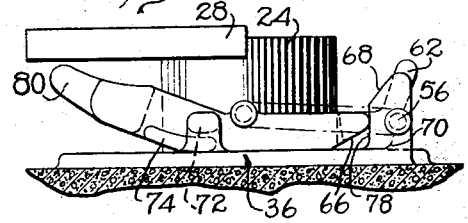
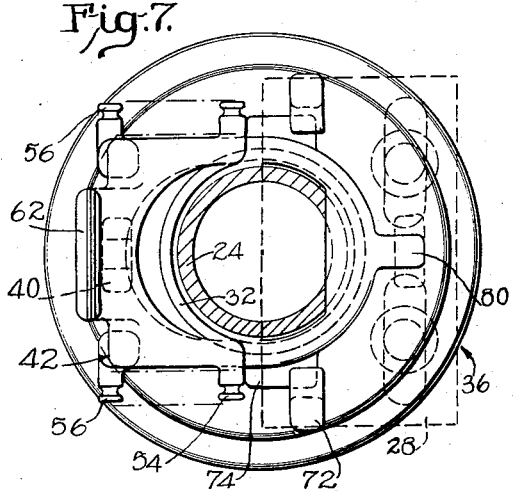
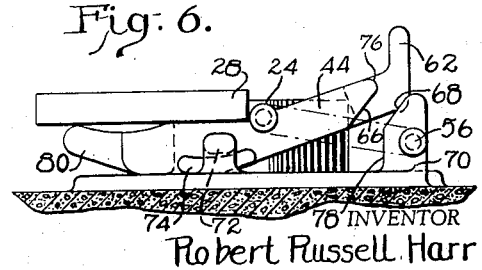
INVENTOR
Robert Russell Harr
BY
ATTORNEY Sept. 27, 1960 R. R. HARR 2,954,100
SAFETY LATCH MECHANISM
Filed Aug. 13, 1959 3 Sheets-Sheet 3

INVENTOR
Robert Russell Harr
BY
ATTORNEY

United States Patent Office 2,954,100
Patented Sept. 27, 1960

2,954,100

SAFETY LATCH MECHANISM

Robert Russell Harr, Fruitland, Md., assignor to Symington-Wayne Corporation, Salisbury, Md., a corporation of Maryland Filed Aug. 13, 1959, Ser. No. 833,429

11 Claims. (Cl. 187—8.49)

This invention relates to a safety latch mechanism for a reciprocating device, and more particularly relates to such a safety latch mechanism for a lifting device.

A safety latch mechanism is a highly useful means for insuring that a reciprocating device, such as a hydraulic lift, does not accidentally or prematurely start its return movement. This type of latching mechanism is particularly useful in conjunction with hydraulic automobile lifts of the type used in service stations for elevating an automobile. A loaded lift of this type might seriously injure a service station attendant if it should accidentally descend upon him. Various manually operated locking devices of this type have been proposed, but in the rush of work, attendants sometimes fail to use them. Furthermore, these existing locks give no signal to indicate when the lift is fully lowered and automobiles can be safely removed from it.

An object of this invention is to provide a simple and economical safety latch mechanism for a reciprocating device;

Another object is to provide such a mechanism which is positive in operation and relatively free of maintenance;

A further object is to provide such a mechanism whose parts are readily exposed for inspection and maintenance; and Still a further object is to provide such a mechanism which provides a positive signal that the device with which it is associated has reached a limit of travel.

In accordance with this invention, a safety latch mechanism includes a notched rod connected to move parallel to the principal direction of movement of the reciprocating device to which it is connected. This rod is inserted to slide within a stationary flange means and a latch ring which contacts this flange means. A resilient means draws the latch ring towards the notched side of the rod with the latch ring arresting backward movement of the rod upon one side of the notch and allowing forward movement when the camming surface on the other side of the notch disengages the latch ring therefrom. A movable connecting means anchors the latch ring to the flange in one of two alternative conditions. In one of these conditions, the latch ring is drawn into forceful contact with the notched side of the rod. This causes the arresting surface of the notch to prevent backward movement of the rod and allows the camming surface of the notch to disengage the latch ring from the notch when the rod moves in the forward direction. In the other of these conditions, this movable connecting means causes the latch ring to be held out of the path of travel of the notch to permit movement of the rod in the backward direction. Furthermore, a shifting means is associated with the movable connecting means for moving the latch ring from one of these conditions to the other to optionally permit latched forward movement of the device and free backward or return movement. Means may be provided for automatic shifting of the mechanism to the latched condition upon arrival of the device at the backward full limit of travel thereby providing a signal that this limit of travel has been reached.

Novel features and advantages of the present invention will become apparent to one skilled in the art from a reading of the following description in conjunction with the accompanying drawings wherein similar reference characters refer to similar parts and in which:

Figs. 2–6 are views in elevation of corresponding portions of the embodiments shown in Fig. 1 in various phases of operation;

Fig. 7 is a cross-sectional view taken through Fig. 1 along the line 7—7;

Figure 1:
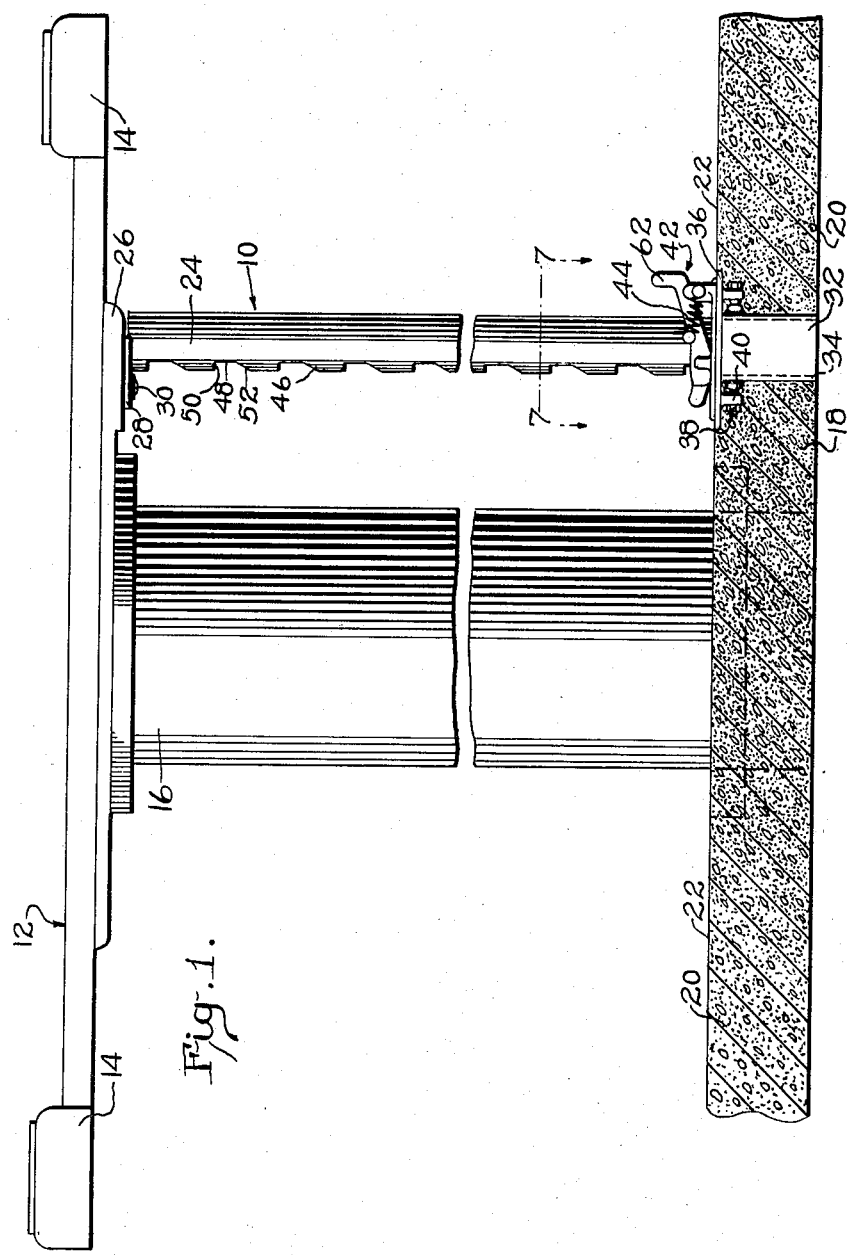
Fig. 1 is a view in elevation of one embodiment of this invention.
Figure 11:
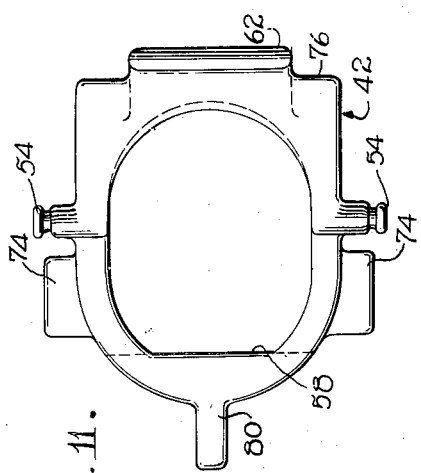
Fig. 11 is a plan view of the latch ring portion of the embodiment shown in Fig. 1.
Figure 12:
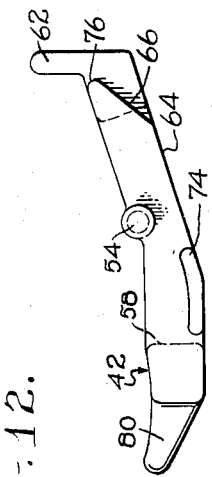
Fig. 12 is a side view in elevation of the latch ring portion shown in Fig. 11.
Figure 10:
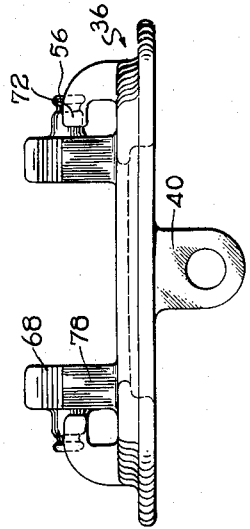
Fig. 10 is an end view in elevation of the flange portion shown in Fig. 8.
Figure 8:
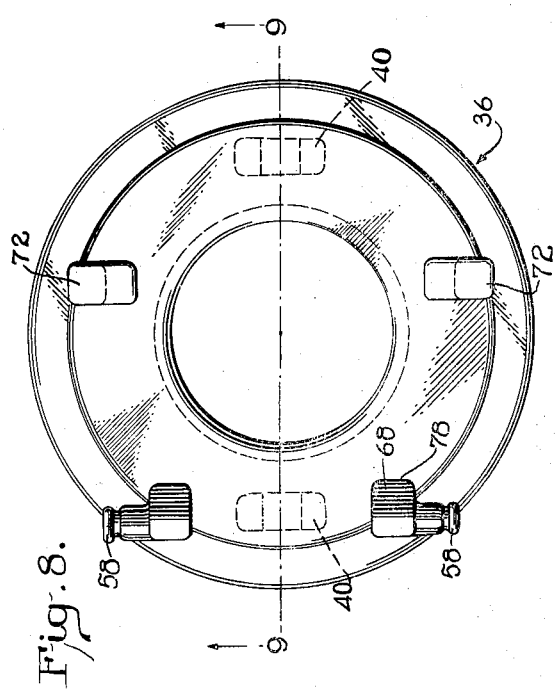
Fig. 8 is a plan view of the flange portion of the embodiment shown in Fig. 1.
Figure 9:
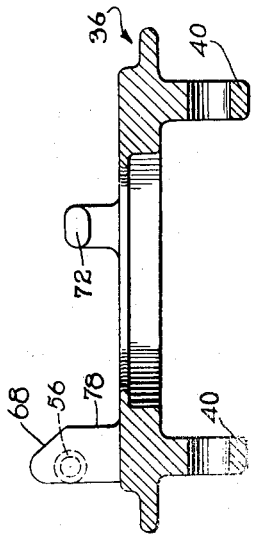
Fig. 9 is a cross-sectional view taken through Fig. 8 along the line 9—9.

In Fig. 1 is shown a safety latch mechanism 10 for a reciprocating device such as the hydraulic lift 12 for raising an automobile which is, for example, of the type described in U.S. Letters Patent 2,826,269. Hydraulic lift 12 includes rails 14 for engaging the frame of a vehicle and a hydraulic lifting piston 16 which moves in and out of well 18 mounted within ground 20 which, for example, is covered with a concrete surface 22.

Safety latch mechanism 10 includes a rod 24 which is, for example, a steel tube which is connected to plate 26 of lift 12 by a flange 28 and suitable cap screws 30. The other end of tube 24 reciprocates parallel to the path of movement of piston 16 within a well 32 enclosed within a sleeve 34 which is, for example, made of steel and inserted within ground 20.

Sleeve 34 is secured to a flange means 36 which is also mounted within concrete surface 22 by means of studs and bolts 38 which are inserted through apertured lugs 40 extending downwardly from flange 36. Flange 36 is later described in detail.

A latch ring 42 which is also later described in detail is connected to flange 36 by a resilient means 44 which is, for example, a tension spring which draws latch ring 42 towards the notched side 46 of rod 24. Latch ring 42 and its mode of cooperation with flange 36 and other elements of safety latch mechanism 10 are later described in detail in various phases of operation. However, it is apparent in Fig. 1 that notches 48 of rod 24 have an arresting surface 50 which is, for example, square disposed in the direction of forward movement of lift 12 and a camming surface 52, which is inclined disposed in the backward direction of movement of lift 12.

Figs. 2–6 show the aforementioned major parts of mechanism 10 in various phases of operation, and the significant details of these parts are described in conjunction with their positions and functions in each of these phases.

In Fig. 2, latch ring 42 is drawn into resilient contact with the notched side 46 of rod 24, by tension spring 44 which reacts between rods or ears 54 upon latch ring 42 and corresponding rods or ears 56 upon a portion of flange 36. In the phase of operation shown in Fig. 2, rod 24 is positioned relative to latch ring 42 in a condition which permits the adjacent or locking surface 58 of latch ring 42 to enter within notch 48 of rod 24. This relationship between latch ring 42 and notched side 46 is one of the two that exists during the upward travel of rod 24.

The other of these relationships is shown in Fig. 3 which shows how the locking surface 58 of latch ring 42 is maintained in resilient contact with the side 46 between notches 48 after rod 24 has moved upward a distance sufficient to cause inclined camming surface 52 to disengage latch ring 42 from notch 48 and thereby permit forward or upward movement of rod 24.

When the operator desires to allow device 12 to lower, he presses down as shown in Fig. 4, for example, with his shoe 60 upon a leg or lip 62 which extends upwardly from latch ring 42. This shifts latch ring 42 from the position shown in Figs. 2 and 3 in which its lower rear surface 64 adjacent flange 36 angularly slopes away from flange 36. Latch ring 42 is maintained in this position with inclined surfaces 66 at the rear of latch ring 42 disposed in contact with correspondingly sloped surfaces 68 formed upon projections 70 extending from flange 36 towards latch ring 42. Overhanging lugs 72 on flange 36 which overlie fins 74 upon latch ring 42 prevent latch ring 42 from being drawn too far away from flange 36 as rod 24 moves upwardly.

When force is applied upon lip 62, as shown in Fig. 4, this shifts latch ring 42 in the direction shown, and engages rear surfaces 76 of latch ring 42 with the relatively perpendicular front surface 78 of projection 70. This maintains locking surface 58 of latch ring 42 out of the path of travel of notches 48 and permits a downward movement of rod 24. The aforementioned portions of latch ring 42 and flange 36 are shown in detail in Figs. 8–12 and reference thereto will clarify the configuration of these aforementioned elements and their functional relationship as described.

In Fig. 5, rod 24 has moved downwardly very close to its lower limit of travel, and connecting flange 28 approaches an extension or nose 80 which projects from the portion of latch ring 42 which engages notches 48. As connecting flange 28 moves downward towards the position shown in Fig. 6, it contacts nose 80 and rocks latch ring 42 about its angularly formed lower surface and disengages rear surfaces 76 of latch ring 42 from surfaces 78 of projection 70 thereby moving sloped portions 66 and 68 of these surfaces towards each other. Fig. 6 shows surfaces 66 and 68 held out of contact with each other by engagement of latch ring 42 with the side of rod 24. Throughout the entire rocking and forward and backward movement of latch ring 42, its fins 74 are of broad enough extent to maintain them locked under overhanging lugs 72 extending from flange means 36.

*Operation*

When lift 12 moves upwardly from the fully lowered position, latch ring 42 is automatically engaged with the notched side 46 of rod 24 to prevent any accidental or premature downward movement of the lifting device. However, when the lift is to be lowered, an operator can conveniently reach extending lip 62 with the front of the sole of his shoe to shift the connecting means between the latch ring and flange made up of various cooperating components from the condition shown in Figs. 1, 2 and 3 where inclined surfaces 66 and 68 of latch ring 42 and flange 36 are in contact with each other to the condition shown in Figs. 4 and 5 where rear surfaces 76 of latch ring 42 engage perpendicular surfaces 78 on projection 70 of flange 36 to maintain locking surface 58 out of the path of travel of notches 48. This shifting is conveniently facilitated by the angularly formed lower surface 64 of latch ring 42.

When lift 12 and attached connecting flange 28 of rod 24 move towards the lower limit of travel, nose or extension 80 of latch ring 42 is contacted somewhere between the position shown in Figs. 5 and 6 which rocks latch ring 42 from the condition shown in Fig. 5 to the condition shown in Fig. 6, and disengages rear surface 66 of latch ring 42 from perpendicular surfaces 78 of projection 70. Springs 44 immediately move latch ring 42 from the position shown in Fig. 5 to that shown in Fig. 6 causing a loud striking noise which indicates to the operator that the lifting device 12 is at its lowermost limit of travel; and it is, therefore, safe to drive a car off from the lift. This prevents driving off before the lift is fully lowered which frequently occurs when there is no other way of checking full lowering other than by stooping and visually checking which is frequently overlooked. Furthermore, the busy clicking provided by the latch ring dropping into each notch as the lift rises, reassures the operator that the latch mechanism is working properly and will safeguard him from a falling lift.

This latching mechanism is simple and economical by virtue of its very few parts which provide a multitude of functions and safeguards. Furthermore, its strong spring action makes it reliable and positive even in the presence of excessive dirt and foreign matter. This dependability of action is further enhanced by the fact that all of its parts are well adapted to heavy and rugged construction with wide clearances. Still further, the mounting of all of the movable parts above the floor and upon the exterior of rod or leg 24 permits constant visual inspection of the device and facilitates immediate replacement of any parts should this need be apparent.

What is claimed is:

1. A safety latch mechanism for a reciprocating device comprising a rod connected to said device and disposed parallel to its principal direction of movement, a flange means including a central aperture large enough to allow said rod to pass freely through it, said flange means being rigidly and stationarily mounted, said rod being inserted to slide through said aperture, a notch in the side of said rod having an arresting surface disposed towards the forward direction of movement of said device and a camming surface disposed towards the backward direction of movement of said device, a latch ring having another central aperture large enough to permit said rod to slide through it, said latch ring contacting said flange means with said rod passing through both of said apertures therein, resilient means connecting said latch ring with said flange means and drawing said latch ring towards the notched side of said rod, the portion of said latch ring which is drawn into contact with said notched side of said rod being small enough to enter within said notch to lock said rod against backward movement when said arresting surface of said notch contacts the portion of said latch ring inserted within said notch, movable connecting means anchoring said latch ring to said flange means in one of two alternative conditions, in one of said conditions said resilient means is permitted to draw said latch ring into forceful contact with the notched side of said rod to cause said arresting surface of said notch to prevent backward movement of said rod and to allow said camming surface of said notch to disengage said latch ring from said notch when said rod moves in the forward direction, in the other of said conditions said movable connecting means causing said latch ring to be maintained in a position in which it is disposed out of the path of travel of said notch to permit movement of said rod in the backward direction, and shifting means associated with said movable connecting means for moving said latch ring from one of said conditions to the other.

2. A safety latch mechanism as set forth in claim 1 wherein said movable connecting means includes projection and overhanging means anchoring said latch ring to said flange means in said principal direction of movement of said device to prevent said resilient means from being strained when said rod moves in the forward direction and said latch ring is cammed out of said notch.

3. A safety latch mechanism as set forth in claim 1 wherein said movable connecting means includes mutually contacting surfaces upon said latch ring and said flange, one of said mutually contacting surfaces includes a protruding section, a projection extends from a portion of said flange means disposed opposite from said notched portion of said rod, and said mutually contacting surfaces are constructed and arranged to permit them to maintain said latch ring in said condition out of the path of movement of said notch and to cooperate in shifting said latch ring to said other condition when force is applied to said latch ring which urges said projection and adjacent portion of said latch ring into engagement.

4. A safety latch mechanism as set forth in claim 3 wherein the side of said projection adjacent said rod includes a sloped upper surface and a substantially perpendicular side surface, and the portion of said latch ring adjacent said projection includes an inclined end which slides over said sloped portion of said projection and engages said perpendicular side surface of said projection.

5. A safety latch mechanism as set forth in claim 3 wherein the lower surface of said latch ring is angularly formed to provide said protruding section, and said latch ring rocks upon said flange means from said one condition to the other.

6. A safety latch mechanism as set forth in claim 1 wherein an extension projects towards the device from the portion of said latch ring which engages said notches, and said extension projects a sufficient distance from said ring to permit a portion of said device to contact it when it approaches said flange means to translate said latch ring sufficiently to shift said movable connecting means into said condition in which said resilient means draws said latch ring into contact with the notched side of said rod.

7. A safety latch mechanism as set forth in claim 1 wherein a leg extends towards said device from the portion of said latch ring which engages said projection to provide a convenient means for exerting force upon said latch ring which causes it to shift into the condition in which it locks said latch ring out of the path of travel of said notched portion of said rod.

8. A safety latch mechanism as set forth in claim 1 wherein a series of said notches are provided in line with each other along the side of said rod.

9. A safety latch mechanism as set forth in claim 2 wherein said overhanging and projection means are provided by a pair of hooked elements extending from the sides of said mounting flange towards said latch ring and a pair of fins extending from the sides of said latch ring under said hooked elements, and said fins being elongated in the direction of movement of said latch ring towards and away from said rod to prevent said latch ring from being drawn too far away from said flange means upon movement of said rod away from said flange means.

10. A safety latch mechanism as set forth in claim 3 wherein a pair of rods extend from the portion of said latch ring adjacent its protruding section, another pair of rods extend from said flange means, and tension springs connect said rods upon said latch ring with said rods upon said projection.

11. A safety latch mechanism as set forth in claim 3 wherein a pair of said projections are disposed upon said mounting flange substantially equally spaced on both sides of the path of movement of said latch ring.

No references cited.